United States Patent
McMann et al.

[11] 3,838,810
[45] Oct. 1, 1974

[54] CONTROL FOR REGULATING ENERGY INPUT TO A GAS BURNER

[75] Inventors: Wilbur S. McMann, Utica; Charles Stang, Jr., Detroit, both of Mich.

[73] Assignee: Maxitrol Company, Southfield, Mich.

[22] Filed: Mar. 14, 1973

[21] Appl. No.: 341,296

[52] U.S. Cl. .................................. 236/9 R, 236/91
[51] Int. Cl. ............................................. F23n 5/14
[58] Field of Search ..................... 236/91, 9 R, 10

[56] References Cited
UNITED STATES PATENTS

| | | | |
|---|---|---|---|
| 2,979,264 | 4/1961 | Robson | 236/10 |
| 3,216,662 | 11/1965 | Gerzon | 236/91 |
| 3,472,452 | 10/1969 | Beeston, Jr. | 236/91 |
| 3,486,693 | 12/1969 | Stang, Jr. et al. | 236/9 A |
| 3,603,504 | 9/1971 | Stang, Jr. et al. | 236/10 |

*Primary Examiner*—William E. Wayner
*Attorney, Agent, or Firm*—Harness, Dickey & Pierce

[57] ABSTRACT

A specific embodiment of the invention is disclosed in an illustrative use for control of a building makeup air heating system whereby the control of the makeup air heating system is more efficiently integrated with the building comfort air heating system. With the invention the temperature to which the makeup air is heated is variable between minimum and maximum preset limits in accordance with building heating demand and the outside air temperature. A pair of sensors are located to sense the temperature of the heated makeup air and a third sensor is located remotely from the first two sensors to sense building air temperature. The three sensors are operatively coupled with an electronic control unit which develops a valve control signal for modulating gas flow to the burner of the makeup air heater. Maximum and minimum makeup air temperatures and desired building air temperature are presettable. The temperature of the heated makeup air is modulated in accordance with both building demand as sensed by the third sensor and changes in outside air temperature as sensed by the pair of sensors. One of the pair of sensors operates in conjunction with the control to maintain a selected minimum makeup air temperature; the other of the pair of sensors in conjunction with the control to limit maximum makeup air temperature. Optimum response and regulation are attained, thereby more effectively integrating the makeup air heating system with the building comfort air heating system.

65 Claims, 3 Drawing Figures

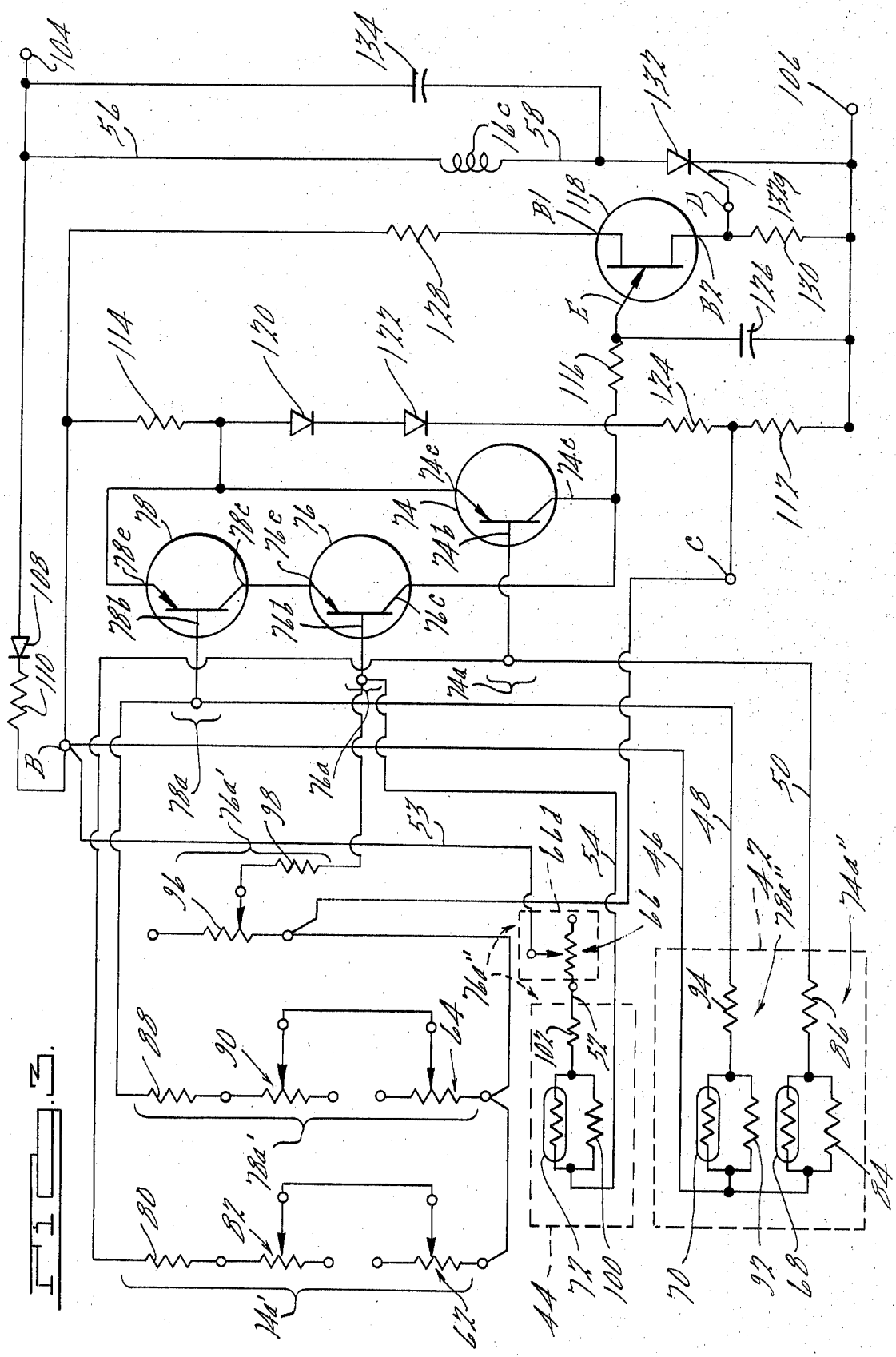

CONTROL FOR REGULATING ENERGY INPUT TO A GAS BURNER

BACKGROUND AND SUMMARY OF THE INVENTION

The present invention relates to heating systems and more particularly to an improved control for regulating the energy input to a gas burner.

While the invention may be practiced in connection with various types of heating systems, the present disclosure illustrates an exemplary use of the invention with a makeup air heating system. In a makeup air heating system, fresh outside air is heated and introduced into a building, usually a large commercial or industrial structure, to replace stale or foul air. The introduction of heated makeup air into the building can affect the operation of the building comfort air heating system by creating undesired temperature fluctuation.

In U.S. Pat No. 3,603,504, which is assigned to the same assignee as the present application, there is disclosed a makeup air heating system wherein outside air is heated to a selected temperature before being introduced into the building. The selected temperature to which the makeup air is heated may be manually set to any desired value within a range of temperatures. Once set, the temperature of the heated makeup air is well regulated to the set temperature by a control circuit of the type disclosed in U.S. Pat. No. 3,486,693, also assigned to the same assignee as the present application. The system automatically adds the required amount of heat to the incoming makeup air so that the makeup air is always introduced into the building at substantially the selected temperature even though the outside air temperature varies over a wide range. In one embodiment of the former patent (FIG. 6 thereof), the control circuit is operatively coupled with a thermostat located in the building. The electrical contacts of the thermostat are connected in parallel with a potentiometer which sets the selected temperature to which the makeup air is to be heated. As long as the building temperature is above the setting of the thermostat, the makeup air remains at the set temperature. When the building temperature, as sensed by the thermostat, drops below the thermostat setting, the contacts close, thereby shorting out the potentiometer to simulate selection of maximum temperature for the makeup air. Thus, for example, if the makeup air system were set to provide 100° F air but could supply a maximum of 140° F air, closure of the thermostat contacts would cause the makeup air to be heated to 140° F instead of 100° F. Once sufficient heat has been supplied to the building to open the thermostat contacts, the temperature of the makeup air would return to 100° F.

The present invention in one respect provides an improvement upon the system disclosed in this prior patent and in another respect provides a novel control arrangement for heating systems in general. In contrast to the control arrangement of the above patent, the present invention when applied to a makeup air heater provides makeup air temperature regulation over an entire continuous range of possible makeup air temperatures with the result that the amount of heat introduced into the building via the makeup air heating system so complements the comfort air heating system that a more constant and closer correspondence of the actual building air temperature to its desired value is attained. In this way, the makeup air heating system is more effectively and efficiently integrated with the building comfort air heating system. Unlike the prior thermostatic system in which the temperature of the makeup air is regulated at a constant preset value and then switched to maximum temperature when the thermostat contacts close, the makeup air system, according to this one aspect of the present invention, lacks any means for setting the makeup air temperature to a constant present value. Instead, the temperature of the makeup air can vary over a wide range of temperatures in accordance with the building air temperature demand. Therefore, in one aspect, the present invention provides a makeup air system wherein the makeup air temperature is regulated by a valve control signal derived from two other signals. One of these latter two signals represents building demand and the other of these two signals represents the effects of changes in outside air temperature. These latter two control signals vary in accordance with the changes in the building air temperature and changes in the outside air temperature, respectively, and in the specific circuit disclosed herein one or the other forms the valve control signal for regulating the makeup air temperature. While the makeup air temperature is being regulated in this fashion with respect to the building air temperature, compensation is simultaneously being made for changes in the outside air temperature, if required. In accordance with a related aspect of this latter feature, not only can maximum makeup air temperature be maintained when the outside air and/or building air temperatures dictate, but also a certain minimum temperature of the makeup air is always assured. A corollary feature resides in the presettability of the maximum and minimum extremes and this permits adaptability of a single makeup air heating system to virtually any application where temperature-regulated makeup air is desired.

A further inventive feature provides a heating system control for regulating energy input to a gas burner of the heating system such that the temperature output of the system is modulated over a range of temperatures between maximum and minimum extremes. Temperature modulation is attained via a control signal derived from a temperature sensing element. The temperature output is limited to the maximum and minimum extremes by signals from maximum and minimum temperature sensing elements.

Of large importance is the electronic control circuit of the invention which attains the foregoing system performance in advantageus fashion. The novel arrangement of circuit components both electronically and physically provides an operating control for a heating system attaining improved performance and regulation and at the same time permitting the heating system to be easily and accurately set to provide desired temperature levels. Thus, the invention is compatible with a variety of potential applications which include not only those where human comfort levels are concerned, but also those requiring other temperature levels, for example, storage of certain types of foods, raw materials, etc.

Additional features, advantages and benefits of the invention will be seen in the ensuing description and claims which are to be taken in conjunction with the accompanying drawings.

BRIEF DESCRIPTION OF THE DRAWINGS

The drawings illustrate a preferred embodiment of the invention in accordance with the best mode presently contemplated for carrying out the invention.

FIG. 3 is an electrical schematic diagram illustrating details of the control of FIG. 2.

DESCRIPTION OF THE PREFERRED EMBODIMENT

Figure 1:
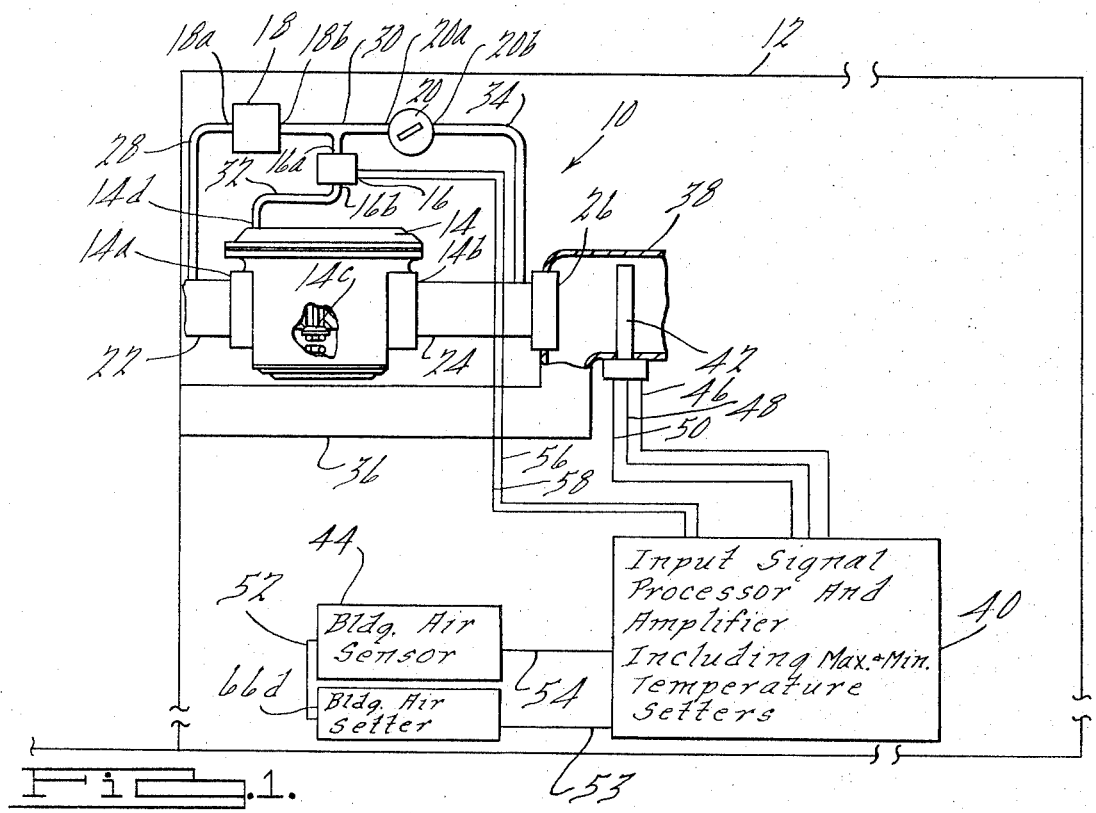
FIG. 1 is a view of a makeup air control system according to the present invention installed in a building.

In FIG. 1, a preferred form of the present invention is illustrated in a makeup air heating system 10 installed in a building 12 which has a conventional comfort air heating system (not shown). System 10 provides a supply of fresh makeup air from outside for building 12 and heats the makeup air to a temperature which is regulated in accordance with the invention herein disclosed. The gas circuit of system 10 comprises a main modulating valve 14, a pilot modulating valve 16, a regulator 18, and a manually adjustable valve 20. Main valve 14 has an inlet 14a, an outlet 14b, a normally closed valve member 14c, and a passage 14d. Inlet 14a is connected by a pipe 22 to a gas supply line (not shown) and outlet 14b by a pipe 24 to a conventional gas burner 26. Regulator 18 has an inlet 18a and an outlet 18b; valve 16, an inlet 16a, an outlet 16b, and a modulating coil 16c (shown in FIGS. 2 and 3); and valve 20, an inlet 20a and an outlet 20b. Inlet 18a is connected by a pipe 28 to pipe 22, and outlet 18b by a pipe 30 both to inlet 20a and to inlet 16a. Outlet 16b is connected by a pipe 32 to passage 14d, and outlet 20b by a pipe 34 to pipe 24. Makeup air from outside passes through an inlet duct 36 for heating by burner 26 and subsequent discharge into building 12 via a discharge duct 38. The gas circuit thus far described, which is preferred for the present invention, is exactly the same as that disclosed in the above U.S. Pat. No. 3,603,504 and hence may be briefly summarized as follows, reference being had to that patent for further details: Regulator 18 closely regulates the gas pressure supplied to pilot modulating valve 16 and manually adjustable valve 20. Valve 20 is adjusted to provide a predetermined minimum flow of gas from regulator 18 to burner 26, thereby adding a certain minimum B.T.U. input to the makeup air which enters the building. Valve member 16 increasingly opens as coil 16c is increasingly energized. This causes increased pressure to be applied to passage 14d and, in turn, valve member 14c correspondingly increasingly opens. Hence, the gas flow through valve 14 to burner 26 also correspondingly increases. Therefore, the gas circuit provides a gas flow rate, and hence, a B.T.U. energy input rate, which increases as the control signal applied to valve 16 increases and which decreases when the control signal decreases.

The electronic control for makeup air heating system 10 includes an input signal processor and amplifier unit 40 (which includes maximum and minimum temperature setters), a discharge air temperature sensing probe 42 positioned in discharge duct 38 to sense the temperature of the heated makeup air and a building air sensor 44 located in building 12 to sense ambient building air temperature. Probe 42 is electrically coupled with unit 40 via three leads 46, 48, and 50; sensor 44 with unit 40 via a lead 54; and coil 16c of valve 16 with unit 40 via leads 56 and 58. A building air temperature setter 66d is operatively coupled with sensor 44 via a lead 52 and with unit 40 via lead 53.

Figure 2:
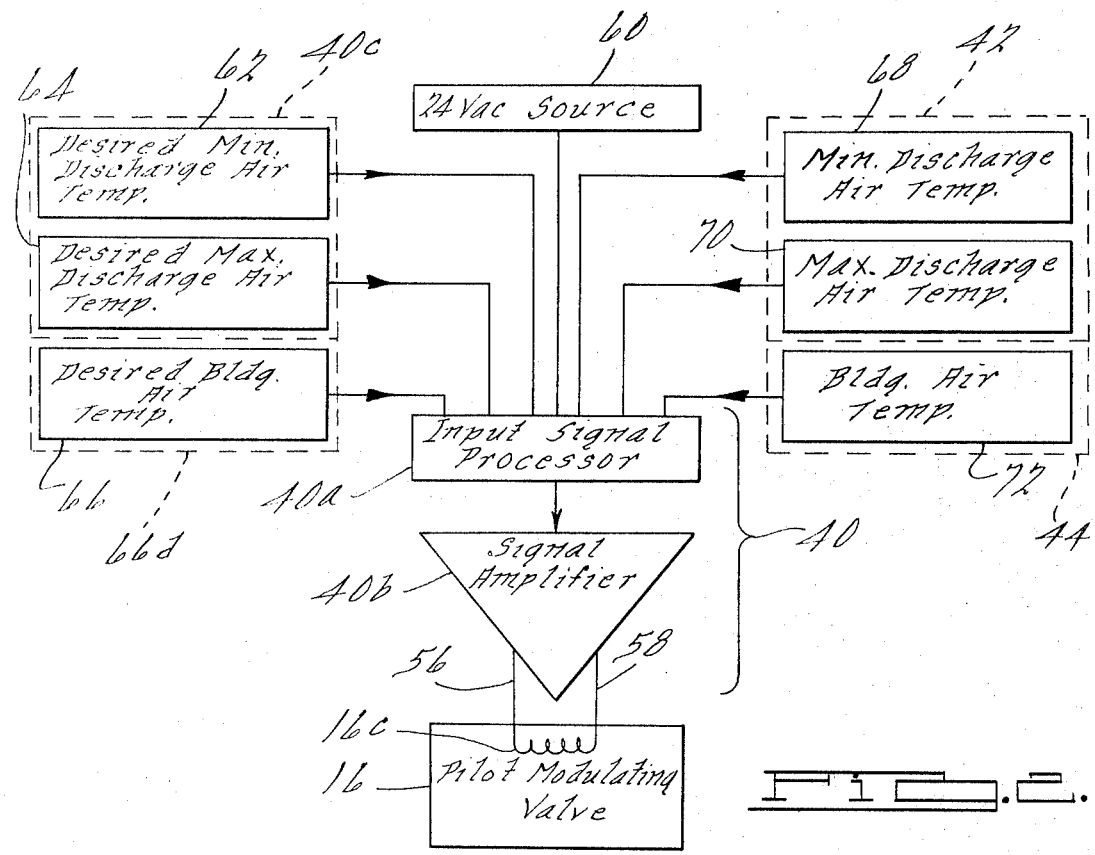
FIG. 2 is a block diagram of the control electronics for the makeup air system of FIG. 1.

Further detail of the electronic control is shown in block diagram form in FIG. 2. Power is provided from an AC source 60. Unit 40 is seen to comprise an input signal processor 40a and a signal amplifier 40b. *Input signal processor 40a* receives a plurality of six input signals. Two signals are supplied from the block 40c in broken lines, and this represents the maximum and minimum temperature setters of unit 40 mentioned above in FIG. 1. The minimum temperature setter is identified by the numeral 62 and sets the minimum discharge air temperature from duct 38; the maximum temperature setter is identified by the numeral 64 and sets the maximum discharge air temperature from duct 38. As will be seen in FIG. 3 setters 62 and 64 take the form of potentiometers. Setter 66d sets the desired building air temperature and in FIG. 3 takes the form of a potentiometer 66. The right-hand three input blocks 68, 70, 72 represent temperature sensors, preferably thermistors, each of which is cofunctional with the corresponding blocks 62, 64, 66. The sensor represented by block 72 is the building air temperature sensor 44 mentioned above in FIG. 1. Thus, the sensor of block 68 senses the heated makeup air temperature and is cofunctional with the potentiometer of block 62 and processor 40a in preventing the heated makeup air temperature from falling below the desired minimum value; the sensor of block 70 senses the heated makeup air temperature and is cofunctional with the potentiometer of block 64 and processor 40a in preventing the heated makeup air temperature from rising above the desired maximum value; and the sensor of block 72 senses the ambient building air temperature and is cofunctional with the potentiometer of block 66 and processor 40a in securing correspondence of the ambient building temperature to its desired value.

Briefly, input signal processor 40a operates in the following fashion. Processor 40a develops a control signal whose value corresponds to the desired rate of gas flow through valve 14 to burner 26. With the inputs represented by blocks 62, 64, and 66 set at desired temperatures, the value of the valve control signal developed by processor 40a represents the required gas flow rate through valve 14 to maintain the ambient building temperature at its desired level as set by block 66 while limiting both maximally and minimally the temperature of the heated makeup air between the values set by blocks 64 and 62, respectively. Processor 40a attains this functional performance while concurrently compensating for any changes which may occur in the outside air temperature. Thus, it can be seen that the control signal developed by processor 40a can vary anywhere between maximum and minimum values to attain optimum regulation of B.T.U. input to building 12 via the makeup air system in response to changes in outside air temperature and/or building air temperature. As a result, the overall performance of the makeup air system according to the present invention attains optimum regulation of the building air temperature in conjunction with the building comfort air heating system for a wide range of outside air temperatures. Signal amplifier 40b amplifies the control signal from processor 40a to a level suitable for energizing coil 16c.

Circuit details of the electronic control are shown in FIG. 3. The blocks 62, 64, and 66 of FIG. 2 represent similarly numbered potentiometers in FIG. 3. Similarly, blocks 68, 70, and 72 of FIG. 2 represent similarly numbered thermistors in FIG. 3. Potentiometer 62 and thermistor 68 are operatively coupled in the input circuit of a minimum temperature control transistor 74; potentiometer 64 and thermistor 70 in the input circuit of a maximum temperature control transistor 78; and potentiometer 66 and thermistor 72 in the input circuit of a building temperature control transistor 76. Potentiometers 62 and 64 are physically mounted on unit 40 (FIG. 1), and unit 40 is preferably located in building 12 where it is conveniently accessible by authorized personnel for presetting the potentiometers. As noted earlier, thermistors 68 and 70 are physically mounted on probe 42. Sensor 44 and setter 66d are located in a desired location of building 12. Sensor 44 and setter 66d are illustrated as separate and remote from unit 40, but it will be appreciated by they could be mounted together and/or included either separately or together in unit 40.

The input circuit of transistor 74, in addition to potentiometer 62 and thermistor 68, includes a resistor 80, a calibration potentiometer 82, a resistor 84, and a resistor 86. Thermistor 68 and resistor 84 are connected in parallel and one terminal of this parallel combination is connected via lead 46 to a terminal B of unit 40 while the other terminal of the parallel combination is connected to one terminal of resistor 86. The other terminal of resistor 86 is connected to the base terminal 74b of transistor 74 via lead 50. Potentiometer 82, potentiometer 62, and resistor 80 are connected in a series circuit between a common terminal C of unit 40 and base terminal 74b of transistor 74. Thus, it will be perceived that the input circuit to the base of transistor 74 comprises a voltage diving circuit 74a connected between terminal B and terminal C with the voltage division (i.e., the connection to base terminal 74b) being taken at the junction of resistor 86 and resistor 80. Potentiometers 82, 62, and resistor 80 form a first portion 74a' of voltage dividing circuit 74a while resistor 86 and the parallel combination of resistor 84 and thermistor 68 form a second portion 74a' of circuit 74a.

Circuit 74a operates as follows. Since terminal B is positive with respect to terminal C (as will be explained later), a fraction of positive voltage is applied to base terminal 74b. This fraction is equal to the resistance of the portion 74a' divided by the sum of the resistances of portions 74a' and 74a". Let it be assumed that the resistance of portion 74a' is fixed by setting potentiometers 62 and 82 to desired settings. Further, let it be assumed that the temperature of the heated makeup air exiting duct 38 rises. The increasing temperature of makeup air causes the resistance of thermistor 68 to decrease. As a result, the resistance of portion 74a" decreases and hence, the voltage applied to the base of transistor 74 becomes increasingly positive. Similarly, as the temperature of makeup air decreases, the resistance of thermistor 68 increases, thereby causing the voltage applied to the base of transistor 74 to become less positive.

In order to explain the effect of potentiometer 62 on the setting of voltage dividing circuit 74a, let it be assumed that the heated makeup air is at a constant temperature so that the resistance of thermistor 68 is constant. As potentiometer 62 is set to increase the resistance thereof in circuit 74a, the voltage applied to the base of transistor 74 becomes increasingly positive. Similarly, as potentiometer 62 is set to decrease the resistance thereof in circuit, the voltage applied to the base of transistor 74 becomes less positive. (Details of the calibration and operating range of transistor 74 and its associated circuit 74a will be explained later.)

The input circuit of transistor 78 comprises, in addition to potentiometer 64 and thermistor 70, a resistor 88, a calibration potentiometer 90, a resistor 92, and a resistor 94. The interconnection of the components 88–94 relative to thermistor 70, potentiometer 64, and transistor 78 is identical to that of elements 80–86 with respect to potentiometer 62, thermistor 68, and transistor 74 and hence, need not be described in detail. Thus, summarily, potentiometers 90, 64, and resistor 88 form a first portion 78a' of a voltage dividing circuit 78a across terminals B and C to transistor 78 while thermistor 70 and resistors 92 and 94 form a second portion 78a". Voltage dividing circuit 78a operates in similar fashion to voltage dividing circuit 74a. For constant makeup air temperature, as the amount of resistance of potentiometer 64 inserted in circuit 78a increases, the voltage applied to base terminal 78b of transistor 78 becomes increasingly positive; and when the amount of resistance decreases, the voltage becomes less positive. With potentiometers 64 and 90 set, when the temperature of the heated makeup air increases, the resistance of thermistor 70 decreases so that the voltage at base 78b becomes more positive; and when the temperature drops, the resistance of thermistor 70 increases, thereby causing the voltage at base 78b to become less positive. (Details of the calibration and operating range of transistor 78 and its associated circuit 78a will be explained later.)

The input circuit of transistor 76 is somewhat like those for transistors 74 and 78 in that it is a voltage dividing circuit 76a connected between terminals B and C for supplying voltage division to the base terminal 76b of transistor 76. Circuit 76a includes, in addition to potentiometer 66 and thermistor 72, a potentiometer 96, a resistor 98, a resistor 100, and a resistor 102. Potentiometer 96 is connected in series with resistor 98 between terminal 76b and terminal C to form a first portion 76a' of voltage dividing circuit 76a. Potentiometer 66 is connected in series with resistor 102 and the parallel combination of thermistor 72 and resistor 100 between terminal B and terminal 76b, and this forms a second portion 76a" of voltage dividing circuit 76a. With potentiometers 66 and 96 set, as the building air temperature increases, thereby decreasing the resistance of thermistor 72, the voltage applied to base 76b of transistor 76 becomes more positive, and when the building air temperature drops, the voltage becomes less positive. In contrast to the circuits 74a and 78a, potentiometer 66 is electrically connected in the same portion of voltage divider circuit 76a as is its associated thermistor 72. Therefore, assuming a constant makeup air temperature, as the amount of resistance of potentiometer 66 connected in circuit increases, the voltage applied to base terminal 76b becomes less positive and when the amount of resistance of potentiometer 66 in circuit decreases, the base voltage at terminal 76b becomes more positive. (Details of the calibration and operating range of transistor 76 and its associated circuit 76a will be explained later.)

Power to the circuit of FIG. 3 is supplied from AC source 60 via terminals 104 and 106. Suitable half wave rectified AC power for the circuits associated with transistors 74, 76, 78 is provided through a diode 108 and resistors 110, 112. Diode 108 and resistor 110 are connected between terminals 104 and B while resistor 112 is connected between terminals C and 106. Diode 108 is arranged to make terminal B positive relative to terminal C. The remainder of the circuit is as follows. The emitter terminals 78e and 74e of transistors 78 and 74, respectively, are connected together and through a resistor 114 to terminal B. The collector terminal 78c of transistor 78 is directly connected to the emitter terminal 76e of transistor 76. The collector terminals 76c and 74c of transistors 76 and 74, respectively, are connected together and through a resistor 116 to the emitter terminal E of a unijunction transistor 118. A pair of diodes 120 and 122 are connected in series between the junction of resistor 114 and transistors 78 and 74 through a resistor 124 to terminal C. A capacitor 126 is connected between terminal E of transistor 118 and terminal 106. A resistor 128 connects the B1 terminal of transistor 118 to terminal B while a resistor 130 connects the B2 terminal of transistor 118 to terminal 106. Coil 16c of valve 16 is connected between terminals 104 and 106 through an SCR 132. The gate terminal 132g of SCR 132 connects to the junction of the B2 terminal of transistor 118 and resistor 130. The connection, identified by the letter D (i.e. between terminals B2 and 132g), can represent the transition from the processor 40a to the amplifier 40b in FIG. 2. A capacitor 134 is connected in parallel with coil 16c to smooth the voltage across coil 16c.

Prior to explaining the detailed operation of transistor circuitry of transistors 74, 76, 78, it is desirable to explain in general terms how coil 16c is energized. Coil 16c is energized in proportion to collector current flow from one or the other of transistors 74 and 76. As the magnitude of collector current increases, capacitor 126 charges at an increasingly faster rate. Hence, capacitor 126 reaches a voltage sufficient to fire transistor 118 and discharge through resistor 130 in an increasingly shorter time. Thus, transistor 118 conducts increasingly earlier in each positive half cycle of AC line voltage. Correspondingly, SCR 132 is fired via gate 132g increasingly earlier in the positive half cycle to thereby provide increased energization for coil 16c. The increasing energization of coil 16c causes pilot valve 16 to modulate main valve 14 such that valve 14 is increasingly opened, thereby providing a greater gas flow and hence, greater BTU input to the makeup air. Similarly, as the magnitude of collector current flow decreases, so does the gas flow through valve 14. Therefore, it will be appreciated that the magnitude of collector current flow from one or the other of transistors 74 and 76 represents the value of a control signal which in amplified form provides modulation of valve 14. Valve 14 is increasingly opened in accordance with increasing magnitude of the control signal. In the instant arrangement the value of the control signal increases as the magnitude of the collector current becomes increasingly positive.

Attention is now focused upon the operating details of the circuit arrangement of transistors 74, 76, 78 and their associated voltage dividing circuits 74a, 76a, and 78a, respectively. It will be observed that the emitter-collector circuits of transistors 78 and 76 are connected in series with each other and the emitter-collector circuit of transistor 74 is connected in shunt with the serially connected transistors 76, 78. Accordingly, the total current flow for charging capacitor 126 through resistor 116 is determined by whether the pair of transistors 76, 78 are more conductive than the single transistor 74. If transistors 76, 78 are more conductive than transistor 74, then the current for charging capacitor 116 is supplied from terminal 76c; if transistors 76, 78 are less conductive, then current comes from terminal 74c.

As mentioned above, the magnitude of the collector current flow from one or the other of transistors 74 and 76 represents the value of the control signal for modulating the flow of gas through valve 14. In the illustrated circuit arrangement therefore, the collector current of transistor 74 is a function solely of the voltage applied to base terminal 74b if there is no conduction through the emitter-collector circuits of transistors 76 and 78; and in this instance since the voltage applied to base terminal 74b solely a function of the temperature sensed by thermistor 68 once voltage dividing circuit 74a has been set and calibrated, the collector current of transistor 74 is solely a function of the temperature of the heated makeup air. The resistance values of the portions 74a' and 74a'' of voltage dividing circuit 74a are selected such that as long as the temperature of the heated makeup air remains above the temperature corresponding to the setting of potentiometer 62, the voltage applied to base terminal 74b is sufficiently positive to hold transistor 74 at cut-off. Since the collector current in transistor 74 is of substantially zero magnitude at cut-off, the collector current from transistor 74 is zero so long as the temperature of the heated makeup air remains above the temperature corresponding to the setting of potentiometer 62. However, if the temperature of the heated makeup air drops below the temperature corresponding to the setting of potentiometer 62, the decreasing base voltage applied to base 74b causes transistor 74 to become increasingly conductive, thereby creating collector current flow from terminal 74c, the magnitude of collector current flow being a function of how much the temperature of the heated makeup air falls below the temperature to which potentiometer 62 is set. The increasing collector current flow from terminal 74c increases the value of the control signal and hence, provides increased energization of coil 16c so that additional gas flow to burner 26 restores the makeup air temperature to that set on potentiometer 62. With this arrangement, transistor 74 and its associated circuit 74a assures that the heated makeup air always will be above a certain minimum temperature regardless of the outside and building air temperatures. This feature is beneficial in preventing introduction of excessively cold outside air into building 12 when the building air temperature is sufficiently warm and the outside air temperature is relatively cold. Potentiometer 62 advantageously allows this minimum temperature to be preset anywhere within a range of possible minimum temperatures, for example, betwee 40° and 80° F. As the resistance of potentiometer 62 is increasingly inserted into the circuit, the voltage applied to base terminal 74b becomes increasingly positive. Accordingly, this has the effect of reducing the minimum temperature. Likewise, as the amount of resistance of potentiometer 62 in circuit is reduced, the minimum temperature is elevated. This portion of the control (i.e., transistor 74 and associated circuit 74a) attains excellent response and optimum regulation of the makeup air temperature to the preset minimum temperature. However, as will be seen, the remainder of the control (transistors 76 and 78 and their circuits 76a, 78a) operates in conjunction with this portion so that the makeup air temperature is modulated above the minimum in accordance with the building demand up to a preset maximum temperature. Calibration potentiometer 82 is set such that the setting of potentiometer 62, as read on a graduated temperature dial, and the actual minimum temperature to which the makeup air is heated are equal. The control is arranged so that the preset minimum makeup air temperature can be attained for the lowest expected outside air temperature.

With transistors 78 and 76 connected in series, the collector current from transistor 76 is a function of both the voltage applied to base terminal 78b as well as the voltage applied to base terminal 76b if there is no emitter-collector current flow in transistor 74. In this instance transistor 78 operates to limit the temperature of the heated makeup air to a preset maximum. Accordingly, the resistance values of the portions 78a' and 78a'' of voltage dividing circuit 78a are selected such that as long as the temperature of the heated makeup air remains below the temperature corresponding to the setting of potentiometer 64, the voltage applied to base terminal 78b is such that transistor 78 is biased to saturation whereby it can conduct maximum collector current. Thus, with the makeup air temperature below maximum, the collector current flow from terminal 76c is a function only of the voltage at base terminal 76b (still for the condition of no emitter-collector current in transistor 74). With voltage dividing circuit 76a calibrated (via potentiometer 96) and set to a desired building air temperature (via potentiometer 66), the resistances of portions 76 a' and 76a'' are such that when the building air temperature, as sensed by thermistor 72, is equal to the desired building air temperature as set by potentiometer 66, transistor 76 is biased just at cut-off. Now if the building air temperature begins to fall, the increasing resistance of thermistor 72 causes the base voltage at terminal 76b to become less positive, thereby creating collector current flow in transistor 76. The current flow from transistor 76 causes coil 16c to be increasingly energized to thereby increase the gas flow to burner 26. Thus, the makeup air system supplies additional heat to the building in supplementation of the building comfort air heating system. As the building air temperature rises, the base voltage at terminal 76b becomes more positive, thereby reducing collector current flow from terminal 76c and in turn the temperature to which the makeup air is heated. In this way, optimum response is attained and the makeup air system is effectively integrated with the building comfort air heating system. Should a condition occur where the temperature of the heated makeup air rises above the temperature corresponding to the setting of potentiometer 64, then the voltage to the base 78b rises to a point where transistor 78 is operated toward cut-off. The amount by which conduction of transistor 78 is reduced depends upon how high the temperature of the makeup air is above the present maximum, with transistor 78 being made less conductive as the difference increases. As a result, the collector current flow from transistor 76 is similarly reduced to reduce gas flow to burner 26. Potentiometer 64 advantageously allows the maximum temperature to be preset anywhere within a range of possible maximum temperatures, for example, between 80° and 140° F. As the resistance of potentiometer 64 is increasingly inserted into the circuit, the voltage applied to base 78b becomes more positive and this has the effect of reducing the maximum temperature. Likewise, as the amount of resistance of potentiometer 64 in circuit is reduced, the maximum temperature is elevated. Calibration potentiometer 90 is set such that the setting of potentiometer 54, as read on a graduated temperature dial, and the actual maximum temperature of the makeup air are equal. Like the minimum temperature limiting circuit, this maximum temperature limiting circuit attains excellent response and control.

Because of the unique arrangement of transistors 74, 76, 78, and their associated input circuitry, the valve control signal is developed in the following way. With the temperature of the heated makeup air in the range between maximum and minimum temperatures, transistor 78 is fully saturated. Thus, transistors 76 and 74 are effectively connected in shunt with each other between resistor 114 and resistor 116. Disregarding for the moment the effect of the collector-emitter voltage drop across transistor 78, collector current will flow only in one of the transistors 74, 76 which has the less positive base voltage applied to it. Thus, for example, if transistor 74 is conducting a certain amount of current and is also not saturated, transistor 76 will not become conductive until its base voltage is reduced to a point where it can become more conductive than transistor 74. When this happens, the emitter voltage at transistor 74 is reduced, thereby tending to make transistor 74 non conducting. Thus, depending upon the input conditions to the respective transistors 76, 74 from their respective input circuits, only the transistor which has the lesser positive base voltage will actually conduct collect current. (In actual practice, it will be appreciated that suitable allowance will be made for the slight amount of collector-emitter voltage drop across transistor 78 which would be absent where the emitter of transistor 76 directly connected to the emitter of transistor 74. Thus, in calibrating the individual circuits, transistors 74 and 76 each begins to conduct at the temperature to which its associated setting potentiometer is set and when one conducts, the other is at cut-off and vice-versa.) In this way, the value of the valve control signal is a function of both inputs to transistors 76 and 74, but has a magnitude determined solely by whichever transistor 74 or 76 is receiving a greater signal from its input circuit. Thus, while the amplified input signals to the transistors 74 and 76 are in effect combined for processing with each other by virtue of the circuit arrangement, the value of the valve control signal is determined only by the larger of the signals but with the signal developed by transistor 76 being qualified by transistor 78 if maximum discharge temperature is reached. This means that even though the input signal to transistor 76 is larger than the input signal to transistor 74 (i.e., transistor 76 conducting), the value of the valve control signal will be reduced when the makeup air temperature tends to exceed the maximum. Reduction of the signal will occur only until the condition creating the tendency toward excessively high temperature is alleviated.

The overall operation of the makeup air heating system according to the present invention can now be fully appreciated. Magnitude of gas flow through valve 14 is established by the value of the valve control signal applied to coil 16c. The magnitude of the valve control signal changes not only in response to changes in the building air temperature, but also in response to changes in the outside air temperature. When the heating demand increases due to either a drop in building air temperature or outside air temperature or both, the energy input to the burner is increased to satisfy the demand. Energy input is reduced when the heated air temperature rises above the maximum and this prevents trouble which might occur should the maximum temperature be exceeded. Thus, at any instant of time, the temperature of the makeup air discharged into building 12 can be any particular temperature over a controlled temperature range having a set maximum and minimum temperature. Accordingly, where the changes in the demand on the system are gradual, the temperature of the makeup air will normally be modulated in between the maximum and minimum temperatures. When the changes are of appreciable value, the temperature will be at either maximum or minimum, according to whether the demand is suddenly increased or suddenly reduced. As the change in demand is satisfied the temperature will normally be modulated back from whichever extreme it was at. It will be observed that an important feature of the invention resides in the interconnection, arrangement and operation of the transistor circuits. This means that if the buidling demand is small when a sudden change in outside temperature occurs, which tends to drop the heated makeup air temperature below the set minimum, then gas flow is increased to maintain the makeup air temperature at the minimum. Similarly, when there is a sudden building demand, the temperature of the makeup air can rise up to the maximum limit. Where there are simultaneous changes, both in building demand and demand imposed by change in outside air temperature, the makeup air system, according to the invention, properly modulates the makeup air temperature over the maximum-minimum ranges whereby optimum integration of the makeup air system with the building air system is attained. By way of example, the circuit component valves are selected such that transistor 76 operates from saturation to cut-off in response to a three degree difference in temperature between actual building temperature and the preset building air temperature. As transistor 76 goes from saturation to cut-off, valve 14 is arranged to operate from full open to full closed position. The other transistors may be arranged to provide similar response for similar temperature changes. The resistors associated with the thermistors in the sensors improve the linearity of the sensing networks. Proper operating voltage and circuit levels and values of circuit components are provided in accordance with well-known electronic circuit practice.

It is to be understood that the foregoing description is that of a preferred embodiment of the invention. Various changes and modifications may be made without departing from the spirit and scope of the invention as defined by the appended claims.

What is claimed is:

1. In a building having a comfort air heating system, a makeup air heating system for the building comprising conducting means for conducting makeup air into the building from the outside, a burner means operable from a source of gas for heating the makeup air, a modulating valve means for modulating the flow of gas to said burner means in accordance with the value of a valve as the value of said valve control signal increases and decreases as the value of said valve control signal decreases and control means for developing said valve control signal and supplying the same to said valve means comprising means for developing an outside air temperature control signal whose value increases as the outside air temperature decreases and vice-versa, means for developing a building air temperature control signal whose value increases as the building air temperature increasingly falls below a desired building air temperature over a control range of temperatures and decreases as the building air temperature returns toward the desired building air temperature over said control range of temperatures, means for combining the building air temperature control signal and the outside air temperature control signal to form said valve control signal, said means for combining the building air temperature control signal and the outside air temperature control signal including means for causing the value of said valve control signal to be established solely by the value of said outside air temperature control signal whenever the building air temperature exceeds said desired building air temperature, and means for supplying said valve control signal to said modulating valve means.

2. The makeup air system of claim 1 wherein said means for combining the building air temperature control signal and the outside air temperature control signal includes means for selecting the larger of the two air temperature control signals to form the valve control signal when the building air temperature drops below said desired building air temperature.

3. The makeup air system of claim 2 wherein the building air temperature control signal and the outside air temperature control signal are the only signals from which the valve control signal is formed.

4. The makeup air system of claim 1 wherein the valve control signal increases in value in the positive direction.

5. The makeup air system of claim 1 wherein said valve means is normally closed and increasingly opens as the value of the valve control signal increases.

6. The makeup air system of claim 1 including means for limiting the temperature of the heated makeup air conducted into the building to a predetermined maximum temperature.

7. The makeup air system of claim 6 wherein the maximum temperature to which the makeup air is heated is presettable to a desired temperature over a range of maximum temperatures.

8. The makeup air system of claim 1 including means for limiting the temperature of the heated makeup air conducted into the building to a predetermined minimum temperature.

9. The makeup air system of claim 8 wherein the minimum temperature to which the makeup air is heated is presettable to a desired temperature over a range of minimum temperatures.

10. The makeup air system of claim 1 wherein said means for developing said outside air temperature control signal and said modulating valve means are arranged such that for any building air temperature above said desired building air temperature, said outside air temperature control signal modulates said modulating valve means to maintain a substantially constant temperature of the heated makeup air as the outside air temperature varies.

11. In a building having a comfort air heating system, a makeup air heating system for the building comprising conducting means for conducting makeup air into the building from the outside, a burner means operable from a source of gas for heating the makeup air, a modulating valve means for modulating the flow of gas to said burner means in accordance with the value of a valve control signal such that flow of gas to said burner means increases as the value of said valve control signal increases and decreases as the value of said valve control signal decreases and control means for developing said valve control signal and supplying the same to said valve means comprising means for developing an outside air temperature control signal whose value increases as the outside air temperature decreases and vice-versa, means for developing a building air temperature control signal whose value increases as the building air temperature increasingly falls below a desired building air temperature over a control range of temperatures and decreases as the building air temperature returns toward the desired building air temperature over said control range of temperatures, means for combining the building air temperature control signal and the outside air temperature control signal to form said valve control signal and means for supplying said valve control signal to said modulating valve means, said means for developing the outside air temperature control signal comprising setting means for setting a desired minimum temperature to which the air entering the building is heated, sensing means for sensing the temperature of the heated air, and means for causing the outside air temperature control signal to increase in value as the temperature sensed by said sensing means increasingly falls below the desired minimum temperature set by said setting means.

12. The makeup air system of claim 11 wherein said setting means is presettable over a range of temperatures.

13. In a building having a comfort air heating system, a makeup air heating system for the building comprising conducting means for conducting makeup air into the building from the outside, a burner means operable from a source of gas for heating the makeup air, a modulating valve means for modulating the flow of gas to said burner means in accordance with the value of a valve control signal such that flow of gas to said burner means increases as the value of said valve control signal increases and decreases as the value of said valve control signal decreases and control means for developing said valve control signal and supplying the same to said valve means comprising means for developing an outside air temperature control signal whose value increases as the outside air temperature decreases and vice-versa, means for developing a building air temperature control signal whose value increases as the building air temperature increasingly falls below a desired building air temperature over a control range of temperatures and decreases as the building air temperature returns toward the desired building air temperature over said control range of temperatures, means for combining the building air temperature control signal and the outside air temperature control signal to form said valve control signal and means for supplying said valve control signal to said modulating valve means, said means for developing the building air temperature control signal comprising means for setting a desired temperature of the building air, sensing means for sensing the temperature of the building air, and means for causing the building air temperature control signal to increase in value as the temperature sensed by said sensing means increasingly falls below the desired building air temperature.

14. The makeup air system of claim 13 wherein said setting means is presettable over a range of temperatures.

15. An air heating system for a space to be heated comprising a heating means including, a burner means operable from a source of gas to heat air, means for passing air over said heating means and discharging the same into said space, a modulating valve means for modulating the flow of gas to said burner means in accordance with the value of a valve control signal such that flow of gas to said burner means increases as the value of said valve control signal increases and decreases as the value of said valve control signal decreases and control means for developing said valve control signal and supplying the same to said modulating valve means, said control means comprising a temperature sensing means located in the space to be heated remote from where the heated air is discharged into the space, a temperature setting means for setting a preselected temperature, means for developing the valve control signal such that the value thereof represents the difference between the preset temperature set on said setting means and the temperature sensed by said sensing means over a range of differences and means for supplying said valve control signal to said modulating valve means whereby the modulating valve means modulates the flow of gas to said burner means such that the temperature of the air discharged into said space is modulated to a temperature over a range of temperatures corresponding to a temperature within the range of temperature differences between the temperature sensed by said sensing means and the temperature preset on said setting means, said control means including means for limiting the temperature of the heated air to a present maximum temperature and for maintaining the temperature of the heated air at said preset maximum for values of said valve control signal above the minimum value of said valve control signal which establishes said preset maximum temperature of the heated air.

16. The air heating system of claim 15 wherein said means for limiting the maximum temperature of heated air comprises means for presetting the maximum temperature to a temperature within a range of maximum temperatures.

17. The air heating system of claim 15 further including means for limiting the temperature of the heated air to a preset minimum temperature.

18. The air heating system of claim 17 wherein said means for limiting the minimum temperature of heated air comprises means for presetting the minimum temperature to a temperature within a range of minimum temperatures.

19. The air heating system of claim 15 wherein said control means comprises electronic circuit means for developing said control signal, said electronic circuit means comprising amplifying means for amplifying the difference between the temperature as sensed by said sensing means and the preset temperature as set by setting means to thereby develop said valve control signal.

20. An air heating system for a space to be heated comprising a heating means including, a burner means operable from a source of gas to heat air, means for passing air over said heating means and discharging the same into said space, a modulating valve means for modulating the flow of gas to said burner means in accordance with the value of a valve control signal such that flow of gas to said burner means increases as the value of said valve control signal increases and decreases as the value of said valve control signal decreases and control means for developing said valve control signal and supplying the same to said modulating valve means, said control means comprising a temperature sensing means located in the space to be heated remote from where the heated air is discharged into the space, a temperature setting means for setting a preselected temperature, means for developing the valve control signal such that the value thereof represents the difference between the preset temperature set on said setting means and the temperature sensed by said sensing means over a range of differences and means for supplying said valve control signal to said modulating valve means whereby the modulating valve means modulate the flow of gas to said burner means such that the temperature of the air discharged into said space is modulated to a temperature over a range of temperatures corresponding to a temperature within the range of temperature differences between the temperature sensed by said sensing means and the temperature preset on said setting means, said control means including means for limiting the temperature of the heated air to a preset maximum temperature, and means for limiting the temperature of the heated air to a preset minimum temperature, said control means comprising electronic circuit means for developing said control signal, said electronic circuit means comprising amplifying means for amplifying the difference between the temperature as sensed by said sensing means and the preset temperature as set by said setting means to thereby develop said valve control signal.

21. The air heating system of claim 20 wherein said sensing means and said setting means are operatively coupled in a voltage dividing circuit and said voltage dividing circuit is coupled to said amplifying means such that the control signal is provided by the voltage dividing action of said voltage dividing means as amplified by said amplifying means.

22. The air heating system of claim 21 wherein said temperature sensing means comprises a thermistor connected in said voltage dividing circuit.

23. The air heating system of claim 22 wherein said amplifying means comprises a current amplifying element for providing current whose magnitude represents the value of said control signal and said voltage dividing circuit is arranged such that as the temperature sensed by said sensing means increases relative to the temperature corresponding to the setting of said setting means, the current output of the current amplifying element decreases in magnitude, and vice versa, and as the temperature to which said setting means is set increases and decreases, respectively, the current output of said current amplifying element increases and decreases, respectively.

24. The air heating system of claim 23 wherein said current amplifying element is a transistor.

25. The air heating system of claim 21 wherein said means for limiting the minimum temperature includes additional amplifying means and additional sensing means for sensing changes in the temperature of the incoming air upstream of said heating means, said additional sensing means being operatively coupled with said additional amplifying means such that said additional amplifying means amplifies changes in the upstream incoming air temperature, said additional amplifying means being operatively coupled with said first mentioned amplifying means such that the larger of the amplified signals developed by each of the two amplifying means forms said valve control signal whereby gas flow is regulated in accordance with the larger of the amplified signals.

26. The air heating system of claim 25 wherein the two amplifying means comprises respective transistors connected in shunt circuit with each other.

27. The air heating system of claim 25 wherein said means for limiting the maximum temperature comprises a third amplifying means operatively coupled with said additional amplifying means, said third amplifying means being coupled with said additional amplifying means and responsive to a selected maximum temperature of air discharged into said space such that the amplified signal from the second amplifying means is reduced by the amplified signal of the third amplifying means when the temperature of the air discharged rises above the selected maximum temperature.

28. The air heating system of claim 27 wherein said third amplifying means and said first mentioned amplifying means comprise respective transistors connected in series circuit with each other.

29. The air heating system of claim 28 wherein said additional amplifying means is connected in shunt with the series connected first and third amplifying means.

30. The air heating system of claim 29 wherein said additional amplifying means comprises a transistor.

31. The air heating system of claim 21 wherein said means for limiting the maximum temperature comprises an additional amplifying means responsive to a selected maximum temperature of air discharged into said space for limiting the air temperature to the selected maximum temperature.

32. The air heating system of claim 31 wherein said additional amplifying means and said first mentioned amplifying means comprise respective transistors connected in series circuit with each other.

33. In a air heating system for a building wherein there are provided conducting means for conducting air into the building from the outside, an air heating means including a burner means operable from a source of gas for heating the air conducted into the building via said conducting means and a modulating valve means for modulating the flow of gas to said burner means in accordance with the value of a valve control signal such that flow of gas to said burner means increases as the value of said valve control signal increases and decreases as the value of said valve control signal decreases: a control means for said air heating system comprising a pair of discharge air temperature sensing means positioned downstream of said burner means to sense the temperature of heated air discharged into the building, a building air temperature sensing means located remotely from the point at which the heated air is discharged into the building for sensing building air temperature, a maximum discharge air temperature setting means for setting a maximum discharge air temperature, a minimum discharge air temperature setting means for setting a minimum discharge air temperature, a building air temperature setting means for setting a desired building temperature, and electronic control circuit means operatively coupled with said three sensing means, said three setting means and said modulating valve means for developing said valve control signal to modulate the gas flow through said modulating valve means in a fashion such that the temperature of the heated air discharged into the building is modulated to temperature within a range of temperatures corresponding to temperature differentials between the actual building air temperature and the desired building air temperature within a range of temperature differentials but when the discharge air temperature rises to the temperature to which the maximum discharge air temperature setting means is set the discharge air temperature is prevented from rising higher and when the discharge air temperature drops to the temperature to which the minimum discharge air temperature setting means is set the discharge air temperature is prevented from dropping lower.

34. The control means of claim 33 wherein said control means comprises a first amplifying means, means operatively coupling said minimum discharge air temperature setting means and one of said discharge air temperature sensing means in a first input circuit with said first amplifying means, a second amplifying means, means operatively coupling said maximum discharge air temperature setting means and the other of said discharge air temperature sensing means in a second input circuit with said second amplifying means, a third amplifying means and means operatively coupling said building air temperature setting means and said building air temperature sensing means in a third input circuit with said third amplifying means.

35. The control means of claim 34 wherein said second amplifying means and said third amplifying means are connected in series circuit and said first amplifying means is connected in shunt with the serially-connected second and third amplifying means.

36. The control means of claim 35 wherein each of first, second, and third amplifying means, respectively, comprises first, second, and third transistors, respectively.

37. The control means of claim 36 wherein the first transistor and its associated input circuit are arranged such that the value of the valve control signal increases and decreases, respectively, as the outside air temperature decreases and increases, respectively.

38. The control means of claim 36 wherein the third transistor and its associated input circuit are arranged such that the value of the valve control signal increases as the building air temperature decreases, and vice versa.

39. In a heating system for heating a fluid passing through the system wherein there are provided in said system a fluid heating means including a burner means operable from a source of gas to heat fluid and a modulating valve means for modulating the flow of gas to said burner means in accordance with the value of a valve control signal such that flow of gas to said burner means increases as the value of said valve control signal increases and decreases as the value of said valve control signal decreases and said fluid is passed through a heat extracting medium wherein heat is extracted from the fluid: a control means for said heating system comprising a pair of temperature sensing means for sensing changes in fluid temperature upstream of said fluid heating means, a third temperature sensing means located at said medium, a maximum fluid temperature setting means for setting a maximum temperature to which the fluid is heated, a minimum fluid temperature setting means for setting a minimum temperature to which the fluid is heated, a third temperature setting means for setting a desired temperature at said medium, and electronic control circuit means operatively coupled with said three sensing means, said three setting means and said modulating valve means for developing said valve control signal to modulate the gas flow through said modulating valve means in a fashion such that the temperature of the heated fluid discharged from the heating system is modulated to temperatures within a range of temperatures corresponding to temperature differentials between the temperature sensed by said third sensing means and the temperature set by said third setting means within a range of temperature differentials but when the fluid temperature rises to the temperature to which the maximum fluid temperature setting means is set the fluid temperature is prevented from rising higher and when the fluid temperature drops to the temperature to which the minimum fluid temperature setting means is set the fluid temperature is prevented from dropping lower.

40. The control means of claim 39 wherein said control means comprises a first amplifying means, means operatively coupling said minimum fluid temperature setting means and one of said fluid temperature sensing means in a first input circuit with said first amplifying means, a second amplifying means, means operatively coupling said maximum fluid temperature setting means and the other of said fluid temperature sensing means in a second input circuit with said second amplifying means, a third amplifying means and means operatively coupling said third temperature setting means and said third temperature sensing means in a third input circuit with said third amplifying means.

41. The control means of claim 40 wherein said second amplifying means and said third amplifying means are connected in series circuit and said first amplifying means is connected in shunt with the serially-connected second and third amplifying means.

42. The control means of claim 41 wherein each of first, second, and third amplifying means, respectively, comprises first, second, and third transistors, respectively.

43. The control means of claim 42 wherein the first transistor and its associated input circuit are arranged such that the value of the valve control signal increases and decreases, respectively, as the fluid temperature upstream of said heating means decreases and increases, respectively.

44. The control means of claim 42 wherein the third transistor and its associated input circuit are arranged such that the value of the valve control signal increases as the medium temperature as sensed by said third sensing means decreases, and vice versa.

45. The control means of claim 39 wherein said pair of sensing means are physically disposed downstream of said heating means.

46. The control means of claim 39 wherein said maximum fluid temperature setting means is presettable over a range of maximum temperatures.

47. The control means of claim 39 wherein said minimum fluid temperature setting means is presettable over a range of minimum temperatures.

48. The control means of claim 39 wherein said control circuit means comprises a first electronic circuit means operatively associated with said maximum fluid temperature setting means and said maximum fluid temperature sensing means for developing a first electronic signal representative of the difference between the temperature set by said maximum fluid temperature setting means and the temperature sensed by said maximum fluid temperature sensing means, second electronic circuit means operatively associated with said minimum fluid temperature setting means and said minimum fluid temperature sensing means for developing a second electronic signal representative of the difference between the temperature set by said minimum fluid temperature setting means and the temperature sensed by said minimum fluid temperature sensing means, and third electronic circuit means operatively associated with said third temperature setting means and said third temperature sensing means for developing a third electronic signal representative of the difference between the temperature set by said third temperature setting means and the temperature sensed by said third temperature sensing means.

49. The control circuit means of claim 48 wherein said control means is arranged such that said first signal overrides said third signal when the maximum fluid temperature is reached to thus maintain said maximum fluid temperature and said second signal overrides said third signal when the minimum fluid temperature is reached to thus maintain said minimum fluid temperature.

50. The control means of claim 49 wherein each of said first, second, and third circuit means includes a corresponding amplifying element for providing the corresponding electronic signal.

51. The control means of claim 50 wherein each said amplifying element comprises a transistor.

52. In a building having a comfort air heating system, a makeup air heating system for the building comprising conducting means for conducting makeup air into the building from the outside, a burner means operable from a source of gas for heating the makeup air, a modulating valve means for modulating the flow of gas to said burner means in accordance with the value of a valve control signal such that flow of gas to said burner means increases as the value of said valve control signal increases and decreases as the value of said valve control signal decreases and control means for developing said valve control signal and supplying the same to said valve means comprising means for developing an outside air temperature control signal whose value increases as the outside air temperature decreases and vice-versa, means for developing a building air temperature control signal whose value increases as the building air temperature increasingly falls below a desired building air temperature over a control range of temperatures and decreases as the building air temperature returns toward the desired building air temperature over said control range of temperatures, means for combining the building air temperature control signal and the outside air temperature control signal to form said valve control signal and means for supplying said valve control signal to said modulating valve means, said means for combining the building air temperature control signal and the outside air temperature control signal including means for selecting the larger of the two air temperature control signals to form the valve control signal.

53. The makeup air system of claim 52 wherein the valve control signal increases in value in the positive direction.

54. The makeup air system of claim 52 wherein said valve means is normally closed and increasingly opens as the value of the valve control signal increases.

55. The makeup air system of claim 52 including means for limiting the temperature of the heated makeup air conducted into the building to a predetermined maximum temperature.

56. The makeup air system of claim 55 wherein the maximum temperature to which the makeup air is heated is presettable to a desired temperature over a range of maximum temperatures.

57. In a building having a comfort air heating system, a makeup air heating system for the building comprising conducting means for conducting makeup air into the building from the outside, a burner means operable from a source of gas for heating the makeup air, a modulating valve means for modulating the flow of gas to said burner means in accordance with the value of a valve control signal such that flow of gas to said burner means increases as the value of said valve control signal increases and decreases as the value of said valve control signal decreases and control means for developing said valve control signal and supplying the same to said valve means comprising means for developing an outside air temperature control signal whose value increases as the outside air temperature decreases and vice-versa, means for developing a building air temperature control signal whose value increases as the building air temperature increasingly falls below a desired building air temperature over a control range of temperatures and decreases as the building air temperature returns toward the desired building air temperature over said control range of temperatures, means for combining the building air temperature control signal and the outside air temperature control signal to form said valve control signal, said means for combining the building air temperature control signal and the outside air temperature control signal including means for causing the valve control signal to modulate said modulating valve means such that for any building air temperature above said desired building air temperature a substantially constant temperature of the heated makeup air is maintained as the outside air temperature varies and means for supplying said valve control signal to said modulating valve means.

58. The makeup air system of claim 57 further including means for limiting the temperature of the heated makeup air conducted into the building to a predetermined maximum temperature.

59. The makeup air system of claim 58 wherein the maximum temperature to which the makeup air is heated is presettable to a desired temperature over a range of maximum temperatures.

60. The makeup air system of claim 59 further including means for presetting the substantially constant temperature of the heated makeup air to a desired temperature over a predetermined range of temperatures.

61. An air heating system for a space to be heated comprising a heating means including a burner means operable from a source of gas to heat air, means for passing air over said heating means and discharging the same into said space, a modulating valve means for modulating the flow of gas to said burner means in accordance with the value of a valve control signal such that flow of gas to said burner means increases as the value of said valve control signal increases and decreases as the value of said valve control signal decreases and control means for developing said valve control signal and supplying the same to said valve means comprising means for developing an upstream air temperature control signal whose value increases as the temperature of the air upstream of said heating means decreases and vice-versa, means for developing a space air temperature control signal whose value increases as the air temperature in said space increasingly falls below a desired space air temperature over a control range of temperatures and decreases as the space air temperature returns towards said desired space air temperature over said control range of temperatures, means for combining the space air temperature control signal and the upstream air temperature control signal to form said valve control signal, said means for combining the space air temperature control signal and the upstream air temperature control signal including means for selecting the larger of the two air temperature control signals to form the valve control signal, and means for supplying said valve control signal to said modulating valve means.

62. An air heating system for a space to be heated comprising a heating means including a burner means operable from a source of gas to heat air, means for passing air over said heating means and discharging the same into said space, a modulating valve means for modulating the flow of gas to said burner means in accordance with the value of a valve control signal such that flow of gas to said burner means increases as the value of said valve control signal increses and decreases as the value of said valve control signal decreases and control means for developing said valve control signal and supplying the same to said valve means comprising means for developing an upstream air temperature control signal whose value increases as the temperature of the air upstream of said heating means decreases and vice-versa, means for developing a space air temperature control signal whose value increases as the air temperature in said space increasingly falls below a desired space air temperature over a control range of temperatures and decreases as the space air temperature returns towards said desired space air temperature over said control range of temperatures, means for combining the space air temperature control signal and the upstream air temperature control signal to form said valve control signal, said means for combining the space air temperature control signal and the upstream air temperature control signal including means for causing the value of said valve control signal to be established solely by the value of said upstream air temperature control signal whenever the space air temperature exceeds said desired space air temperature, and means for supplying said valve control signal to said modulating valve means.

63. An air heating system for a space to be heated comprising a heating means including a burner means operable from a source of gas to heat air, means for passing air over said heating means and discharging the same into said space, a modulating valve means for modulating the flow of gas to said burner means in accordance with the value of a valve control signal such that flow of gas to said burner means increases as the value of said valve control signal increases and decreases as the value of said valve control signal decreases and control means for developing said valve control signal and supplying the same to said valve means comprising means for developing an upstream air temperature control signal whose value increases as the temperature of the air upstream of said heating means decreases and vice-versa, means for developing a space air temperature control signal whose value increases as the air temperature in said space increasingly falls below a desired space air temperature over a control range of temperatures and decreases as the space air temperature returns towards said desired space air temperature over said control range of temperatures, means for combining the space air temperature control signal and the upstream air temperature control signal to from said valve control signal, said means for developing the upstream air temperature control signal comprising setting means for setting a desired minimum temperature of the air discharged into said space, sensing means for sensing the temperature of the air discharged in said space and means for causing the upstream air temperature control signal to increase in value as the temperature sensed by said sensing means increasingly falls below the desired minimum temperature set by said setting means, and means for supplying said valve control signal to said modulating valve means.

64. An air heating system for a space to be heated comprising a heating means including a burner means operable from a source of gas to heat air, means for passing air over said heating means and discharging the same into said space, a modulating valve means for modulating the flow of gas to said burner means in accordance with the valve control signal such that flow of gas to said burner means increases as the value of said valve control signal increases and decreases as the value of said valve control signal decreases and control means for developing said valve control signal and supplying the same to said valve means comprising means for developing an upstream air temperature control signal whose value increases as the temperature of the air upstream of said heating means decreases and vice-versa, means for developing a space air temperature control signal whose value increases as the air temperature in said space increasingly falls below a desired space air temperature over a control range of temperatures and decreases as the space air temperature returns towards said desired space air temperature over said control range of temperatures, means for combining the space air temperature control signal and the upstream air temperature control signal to form said valve control signal, said means for developing the space air temperature control signal comprising means for setting a desired temperature of the air in said space, sensing means for sensing the temperature of the air in said space, and means for causing the space air temperature control signal to increase in value as the temperature sensed by said sensing means increasingly falls below the desired space air temperature, and means for supplying said valve control signal to said modulating valve means.

65. For a space to be heated by a heating system of the type comprising a burner means energized by gas to heat air and a modulating valve means for modulating the flow of gas to said burner means in accordance with the value of a valve control signal such that the flow of gas through said valve means increases as the value of said valve control signal increases and decreases as the value of said valve control signal decreases, said system including means for passing air over said heating means and discharging the heated air into said space, a novel control circuit means for developing said valve control signal comprising: a first electronic circuit means for developing a first electronic signal representative of the difference between the upstream temperature of air upstream of said heating means and a desired temperature to which the air is heated, second electronic circuit means for developing a second electronic signal representative of the difference between the temperature in said space and a desired temperature for said space and third electronic circuit means responsive to said first and second signals for causing the value of said valve control signal to represent the larger of said first and second signals.

* * * * *